United States Patent Office 3,475,450
Patented Oct. 28, 1969

3,475,450
ARYLSULFONYLUREAS AND ARYLSULFONYLTHIOUREAS
Hans-Joachim Kabbe, Leverkusen, and Walter Puls, Wuppertal-Elberfeld, Germany, assignors to Farbenfabriken Bayer Aktiengesellschaft, Leverkusen, Germany, a corporation of Germany
No Drawing. Filed Nov. 9, 1967, Ser. No. 681,923
Claims priority, application Germany, Nov. 16, 1966, F 50,688; Apr. 6, 1967, F 52,051
Int. Cl. C07d 27/74; A61k 27/00
U.S. Cl. 260—326.1                      10 Claims

ABSTRACT OF THE DISCLOSURE

Oral antidiabetic compounds are provided of the formula:

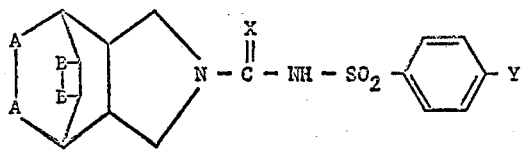

in which

A—A is

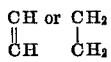

and B—B is

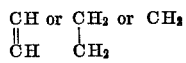

X is oxygen or sulphur, and
Y is hydrogen, methyl, acetyl, amino or halogen.

Two to 500 mg. and preferably about 25 to 200 mg. of one of the foregoing compounds in a suitable carrier constitutes a daily dose for the treatment of diabetes.

---

It is known that certain arylsulphonylurea derivatives have a hypoglycemic action. In particular, N-(4-methylbenzenesulphonyl) - N' - butylurea (tolbutamide) has achieved great importance as a medicament on account of its hypoglycemic properties. Furthermore this compound is well tolerated.

It has now been found that arylsulphonylureas and -thioureas of the formula:

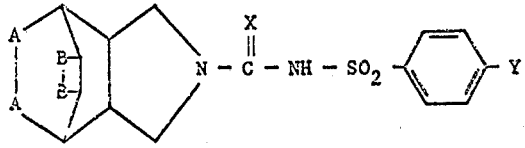

in which

A—A is

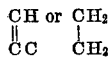

and B—B is

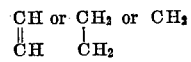

X is oxygen or sulphur, and
Y is hydrogen, methyl, acetyl, amino or halogen, have a powerful hypoglycemic effect which is considerably greater than that of tolbutamide. The new compounds are therefore useful as medicaments to be administered orally for the treatment of diabetes. About 2 mg. to about 500 mg., preferably about 25 mg. to about 200 mg., per day is required per patient in a suitable carrier or vehicle. The new compounds have a very low toxicity which is above 1.5 g./kg. in the mouse.

These new aryl sulphonylurea derivatives are prepared by methods known per se either by reacting a tetracyclic amine of the formula:

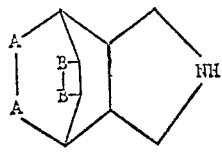

with an arylsulphonylisocyanate or arylsulphoisothiocyanate of the formula:

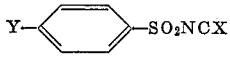

in which A, B, X and Y have the meanings set forth above, or by reacting a tetracyclic amine of the formula:

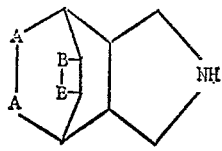

with an arylsulphonylaminocarbonyl- or -thiocarbonyl compound of the formula:

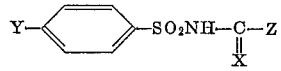

in which X and Y have have the meanings set forth above and Z is a reactive radical capable of reacting with an amine of the formula:

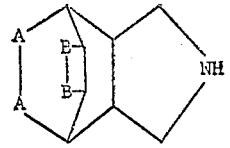

with liberation of HZ and formation of the above-mentioned arylsulphonylurea derivatives. For example, Z is a halogen or an alkoxy or alkylmercapto group, or a substituted or unsubstituted amino or acylamino group. Examples of these arylsulphonyl aminocarbonyl- or thiocarbonyl compounds are: arylsulphonylcarbamic acid chlorides or -thiocarbamic acid chlorides, arylsulphonylcarbamic acid esters or -dithioesters, arylsulphonylureas or -thioureas and N-arylsulphonyl-N'-acylureas or -thioureas.

Alternatively, the new arylsulphonylureas or -thioureas are prepared by reacting an arylsulphonylamide of the formula:

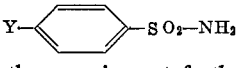

in which Y has the meaning set forth above, either as such or in the form of an alkali metal salt, with a compound of the formula:

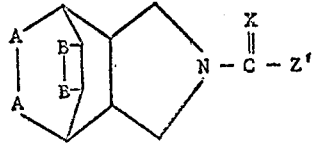

in which A, B and X have the meanings set forth above and Z' is halogen (preferably chlorine or bromine), an alkoxy group (preferably of 1 to 4 carbon atoms), an alkylmercapto group (preferably of 1 to 4 carbon atoms), or an amino or acylamino group (preferably acetyl or benzoylamino), which amino or acylamino group may be substituted by one or two lower alkyl radicals (preferably of 1 to 4 carbon atoms). Compounds of this type which may be used are the corresponding carbamic acid chlorides, thiocarbamic acid chlorides, urethanes, thiocarbamic acid esters, dithiocarbamides, and ureas or thioureas which may be acylated.

Furthermore, the new arylsulphonylureas and -thioureas are also prepared by reacting an alkali metal salt of an N-bromo-sulphonamide of the formula:

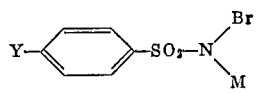

wherein Y has the meaning set forth above and M is an alkali metal, with an N-formyl or N-thioformyl compound of the formula:

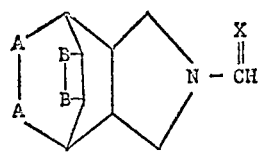

wherein X is oxygen or sulphur and A and B have the meanings set forth above.

The reaction to produce the compounds of the invention is carried out in the presence or absence of suitable inert solvents or diluents and, depending on the reactivity of the components, the reaction either proceeds exothermally or has to be assisted by application of heating. The end products are isolated by the usual methods. They can be purified by reprecipitation or recrystallization.

Arylsulphonylthioureas of the formula:

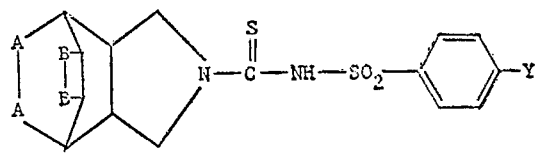

in which A, B and Y have the meanings set forth above, or their S-alkylisothiourea derivatives, are converted into the corresponding urea derivatives of the formula:

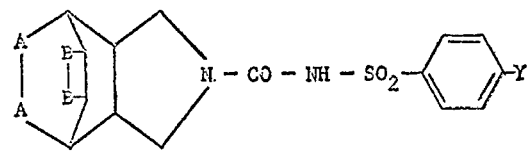

in which A, B and Y have the meanings set forth above, by the action of heavy metal salts (see Houben-Weyl, 4th edition, vol. 8, pages 162-163) or by oxidation. Arylsulphonylguanidines of the formula:

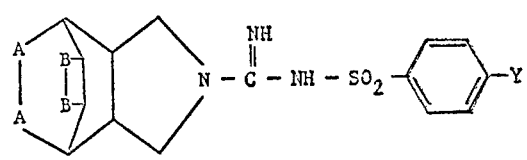

in which A, B and Y have the meanings set forth above are converted into the corresponding urea derivatives by hydrolysis.

The tetracyclic amines of the formula:

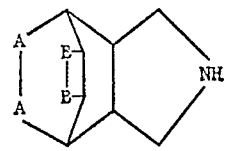

used as starting material, in which A—A has the meaning set forth above and B—B is a $CH_2$ group may, for example, be obtained as follows:

Cycloheptatriene is reacted with maleic acid anhydride in a manner known from the literature [K. Adler and G. Jacobs, Chem. Ber. 86, page 1528 (1953)] to form the tetracyclic anhydride of the formula:

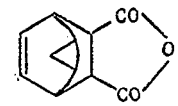

which reacts with ammonia to yield the imide:

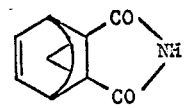

which yields the amine:

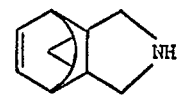

on reduction.

When the C=C double bond in these compounds is hydrogenated, an end product of the formula:

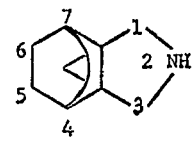

is obtained.

Preparation of the tetracyclic amines of the formula:

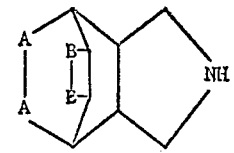

used as starting materials, in which
A—A stands for

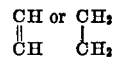

and B—B stands for

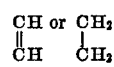

will now be explained with reference to the following example:

Cyclooctatetraene is reacted with maleic acid anhydride in known manner [W. Reppe and coworkers, Ann. 560, page 1 (1948)] to form the tetracyclic anhydride of the formula:

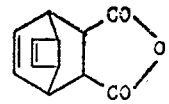

which reacts with ammonia to yield the imide of the formula:

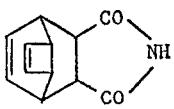

On reduction of this compound, one solution obtains an amine of the formula:

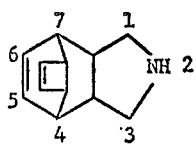

Hydrogenation of the C=C double bonds in this compound yields, as end product, the compound of the formula:

The invention is further illustrated by the following non-limitative examples.

EXAMPLE 1

9.25 g. of 4,7-endocyclopropylene - $\Delta^5$ - hexahydroisoindole are stirred in 20 ml. of benzene, and 9.85 g. of P-tolylsulphoisocyanate in 20 ml. of benzene are added over a period of 6 minutes. The temperature is kept below 50° C. by cooling. After the reaction mixture has been left to stand for 20 hours at room temperature, the reaction product is extracted with sodium bicarbonate solution. Acetic acid is added to the organic phase which is then concentrated by evaporation. 13 g. (65%) of N-(tosylaminocarbonyl)-4,7-endocyclopropylene - $\Delta^5$ - hexahydroisoindole are obtained in the form of colorless crystals melting at 90° C.

When 1 mg./kg. of this compound is administered to rats, the blood sugar level is reduced by 30 to 40% over 6 hours.

EXAMPLE 2

A solution of 6.4 g. of P-toluenesulphonyl isothiocyanate in 20 ml. of benzene is added dropwise over a period of 2 minutes to a solution of 4.8 g. of 4,7-endocyclopropylene-$\Delta^5$-hexahydroisoindole in 20 ml. of benzene. When this reaction mixture has been left to stand at room temperature for several days, 8.2 g. (73%) of N-(tosylaminothiocarbonyl) - 4,7 - endocyclopropylene - $\Delta^5$ - hexahydroisoindole of melting point 163 to 164° C. are obtained.

When 3–10 mg./kg. of this compound are administered to rats, the blood sugar level is lowered by 12 to 35% over several hours.

EXAMPLE 3

A solution of 3.7 g. of benzene sulphoiscyanate in 10 ml. of benzene is added to a solution of 3.2 g. of 4,7-endocyclopropylene - $\Delta^5$ - hexahydroisoindole in 10 ml. of benzene, the temperature rising to 65° C. After 24 hours, the solution is shaken with 20 ml. of dilute acetic acid, whereupon 3.8 g. (55%) of N-(phenylsulphaminocarbonyl) - 4,7 - endocyclopropylene - $\Delta^5$ - hexahydroisoindole precipitate. Melting point 178–180° C.

When 2.5 mg./kg. of this compound are administered to rats, the blood sugar level is reduced by 20 to 30% over 6 hours.

EXAMPLE 4

A solution of 5.3 g. of 4,7-endocylopropylene - octahydroisoindole in 20 ml. of benzene is stirred for 5 minutes with a solution of 6.4 g. of P-tosylisocyanate in 20 ml. of benzene. After 24 hours, the clear solution is shaken with 100 ml. of 5% acetic acid, whereupon 10 g. (86%) of N-(tosylaminocarbonyl) - 4,7 - endocyclopropylene - octahydroisoindole precipitate. Melting point 124–126° C.

When 2.5 mg./kg. of this compound are administered to rats, the blood sugar level is lowered by 20 to 30% over 6 hours.

EXAMPLE 5

8.7 g. of 4.7-endocyclobutenylene - $\Delta^5$ - hexahydroisoindole were added to 100 ml. of benzene with stirring, and a solution of 9.8 g. of P-tosylisocyanate in 100 ml. of benzene was then stirred in, the temperature being kept below 50° C. After 4 hours, 15 g. (81%) of N-(tosylaminocarbonyl) - 4,7 - endocyclobutenylene - $\Delta^5$-hexahydroisoindole were separated by suction filtration. Colorless crystals of melting point 147–148° C. were obtained.

When 0.25 to 0.5 mg./kg. of this compound are administered to rats, the blood sugar level is reduced by 10 to 20% over 6 hours.

EXAMPLE 6

A solution of 6.4 g. of 4,7-endocyclobutenylene - $\Delta^5$-hexahydroisoindole in 30 ml. of benzene is added in the course of 3 minutes to a solution of 6.8 g. of phenylsulphoisocyanate in 30 ml. of benzene, the temperature being kept at 50° C. by cooling. When left to stand for 2 days at room temperature, 9.9 g. (75%) of N-(phenylsulphonylaminocarbonyl) - 4,7 - endocyclobutenylene-$\Delta^5$-hexahydroisoindole precipitate. Colorless crystals, melting at 171 to 174° C., are obtained.

When 0.5 mg./kg. of this compound are administered to rats, the blood sugar level is reduced by 10 to 20% over several hours.

EXAMPLE 7

17.6 g. (94%) of N-(tosylaminocarbonyl)-4,7-endocyclobutylene-octahydroisoindole are obtained from 8.8 g. of 4,7-endocyclobutylene-octahydroisoindole and 9.85 g. of p-tosylisocyanate in 100 ml. of benzene in a manner analogous to that used in the first two examples. Colorless crystals, melting at 172 to 174° C. (from methylene chloride/petroleum ether), are obtained.

When 0.25 to 0.5 mg./kg. of this compound are administered to rats, the blood sugar level is reduced by 10 to 20% over 6 hours.

EXAMPLE 8

10 g. (94%) of N-(p-fluorobenzenesulphonylaminocarbonyl)-4,7-endocyclobutylene-octahydroisoindole are obtained by reaction between 5.7 g. of p-fluorobenzenesulphoisocyanate and 4.9 g. of 4,7-endocyclobutylene-octahydroisoindole in 25 ml. of benzene over a period of 24 hours. Colorless crystals, melting at 84–87° C. are obtained.

When 10 mg./kg. of this compound are administered to rats, the blood sugar level is reduced by 10 to 30% over several hours.

EXAMPLE 9

34 g. (89%) of N-(p-chlorobenzenesulphonylaminocarbonyl)-4,7 - endocyclobutylene-octahydroisoindole are obtained by reaction between 21 g. of p-chlorobenzenesulphoisocyanate and 17 g. of 4,7-endocyclobutylene-octahydroisoindole in 60 ml. of benzene. Colorles crystals, melting at 83 to 85° C. are obtained.

When 10 mg./kg. of this compound are administered to rats, the blood sugar level is reduced by 30% over several hours.

What is claimed is:
1. A compound of the formula:

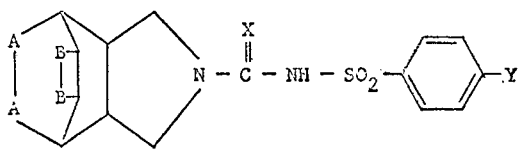

in which
A—A is

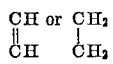

and B—B is

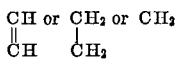

X is oxygen or sulphur, and
Y is hydrogen, methyl, acetyl, amino or halogen.

2. The compound of claim 1 which is N-tosylaminocarbonyl) - 4,7 - endocyclopropylene - $\Delta^5$ - hexahydroisoindole.

3. The compound of claim 1 which is N-(tosylaminothiocarbonyl)-4,7 - endocyclopropylene-$\Delta^5$-hexahydroisoindole.

4. The compound of claim 1 which is N-(phenylsulphonylaminocarbonyl)-4,7 - endocyclopropylene-$\Delta^5$-hexahydroisoindole.

5. The compound of claim 1 which is N-(tosylaminocarbonyl)-4,7-endocyclopropylene-octahydroisoindole.

6. The compound of claim 1 which is N-(tosylaminocarbonyl)-4,7-endocyclobutenylene - $\Delta^5$ - hexahydroisoindole.

7. The compound of claim 1 which is N-(phenylsulphonylaminocarbonyl) - 4,7 - endocyclobutenylene - $\Delta^5$-hexahydroisoindole.

8. The compound of claim 1 which is N-(tosylaminocarbonyl)-4,7-endocyclobutylene-octahydroisoindole.

9. The compound of claim 1 which is N-(p-fluorobenzene-sulphonylaminocarbonyl) - 4,7 - endocyclobutylene-octahydroisoindole.

10. The compound of claim 1 which is N-(p-chlorobenzene-sulphonylaminocarbonyl) - 4,7 - endocyclobutylene-octahydroisoindole.

References Cited

UNITED STATES PATENTS 3,415,842   12/1968   Mizzoni _____ 260—326.1

ALEX MAZEL, Primary Examiner

J. A. NARCAVAGE, Assistant Examiner

U.S. Cl. X.R.

260—239.6, 326, 346.3; 424—229, 274